C. H. McCORMICK.
REAPER.
No. 5,335. Patented Oct. 23, 1847.
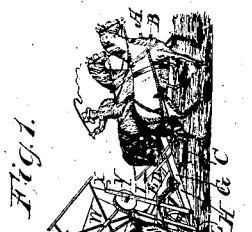
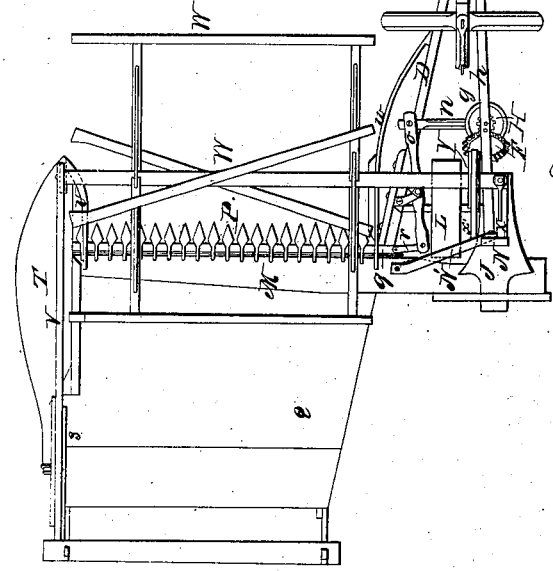
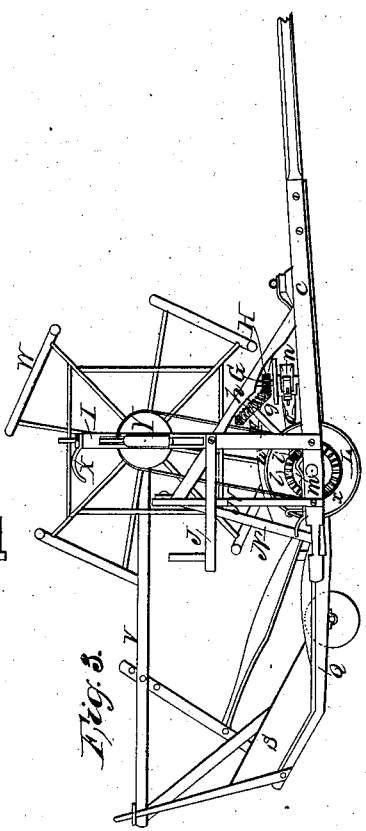

UNITED STATES PATENT OFFICE.

C. H. McCORMICK, OF STEELE'S TAVERN, VIRGINIA.

IMPROVEMENT IN REAPING-MACHINES.

Specification forming part of Letters Patent No. 5,335, dated October 23, 1847.

*To all whom it may concern:*

Be it known that I, CYRUS H. McCORMICK, of Steele's Tavern, in the county of Rockbridge and State of Virginia, have invented new and useful Improvements in the Reaping-Machine formerly patented by me; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a perspective view; Fig. 2, a plan, and Fig. 3 a side elevation.

The same letters indicate like parts in all the figures.

The reaping-machines heretofore made are defective in the following particulars: The driving-wheel is placed forward of the mechanism that operates the vibrating sickle, and so far forward as to leave too much of the weight of the machine back of the driving-wheel, and therefore tending to strain the horses as well as the frame of the machine, and the gearing which communicates motion to the crank is placed back of the driving-wheel, which is therefore subject to be clogged by sand, dirt, straw, &c., and in consequence of the relative position of the various parts the attendant is obliged to walk on the ground, by the side of the machine, to rake the cut grain from the platform as it is delivered and laid thereon by the reel. These defects, which have so much retarded the introduction into practical and general use of reaping-machines, I have remedied by my improvements, the nature of which consists in placing the driving-wheel farther back than heretofore, and back of the gearing which communicates motion to the sickle, which is placed on a line back of the axis of the driving-wheel, the connection being formed by means of a lever and connecting-rod, thus placing the cog-gearing which operates the crank forward of the driving-wheel, for the purposes described, and also bringing the driving-wheel sufficiently far back to balance the frame of the machine with the raker on it, and make room for him to sit or stand on the frame back of the driving-wheel and with his back to the horses, so that from this position and the placing of the reel farther forward than heretofore and making it shorter, together with the employment of a wheel board or guide, which prevents the grain from passing under the machine or into the gearing, thereby avoiding the necessity of a long reel, he can rake off the grain with a sweep of his rake (having the free use of his body and arms) in a curve of which his body is the center, and thus lay the grain on the ground with the heads outward at right angles to the swath, which cannot be done if the raker walks on the ground by the side of the machine, as heretofore, for then the sweep which he makes with his rake relatively to the motion of the machine lays the grain on the ground with the heads oblique instead of at right-angles with the swath, as with the improved mode.

In the accompanying drawings, M represents a flat beam, (called the "finger-piece,") to a part of the forward edge of which are secured the fingers P, such as are used in the machine heretofore patented by me, and under these fingers is arranged the vibrating sickle, which receives its vibratory motion in manner to be hereinafter described. The finger-piece is firmly attached at one end to the two oblique hounds C and D, which run toward each other and are bolted to the tongue A, the forward end of which passes through the breast-piece B. The team is harnessed to the tongue, hounds, and breast-piece in the usual or any desired manner. The axle of the driving-wheel L has its bearings in the two hounds, so near the backend thereof, as just to leave room for the wheel to run clear of the finger-piece, and to the outer end of the axle of the driving-wheel is attached a beveled master cog-wheel, *l*, which communicates motion to a bevel-pinion, *l'*, on the lower end of an inclined arbor, to the upper end of which there is another beveled wheel, F, which communicates motion to the driver-pinion H on a vertical crank-arbor, G, that has a fly-wheel, *g*, on it between the crank and pinion. The crank-arbor has its bearings on the outside hound and the oblique brace *h*, and the inclined arbor has its upper bearing on the oblique brace and its lower end in a shifting-lever, *m*, by means of which the pinion *l'* can be thrown in and out of gear with the master bevel-wheel *l* when it is desired to reap or move the machine without reaping. A connecting-rod, *n*, from the crank extends horizontally to the forward end of a lever, o, which turns on a fulcrum-pin, p, attached to the inside hound, and thence runs back to form a connection with the end of the sickle q by means of a short connecting-rod, r. By this arrangement of parts the gearing is placed forward of the driving-wheel, and motion is communicated from thence to the sickle, back of the axis of the driving-wheel, by the vibrating lever, thus placing the driving and supporting wheel back of the gearing and far enough to balance the weight of the frame, and the attendant or raker is placed on a seat, J, over one end of the finger-piece. This seat is attached to a seat-post, N, which rises from the outside hound, and to the oblique brace h, and it is braced also by the diagonal wheel-brace N′, which runs down from the post to the finger-bar M, near to its junction with the inside hound. From this position, as represented in Fig. 1 of the drawings, the raker can get at the grain back of the wheel, and by a natural sweep of his arms deliver it onto the ground at right angles to the swath, as shown in the figure. To give free scope to the arms of the raker, the reel W is made shorter than usual at that end, instead of overlapping or extending beyond the range of fingers, and to prevent the grain or straw from passing under the frame or into the gearing which operates the sickle there is what I denominate a "wheel-board," w—that is, a curved board the forward end of which is secured to the inside hound. The forward end is curved to force the grain inward toward the reel, and then it runs back to the platform Q, parallel with the plane of motion of the end of the reel. At the other end of the finger-bar there is a separator, T, or long finger, which projects beyond the points of the fingers P to separate the grain that is to be cut, and to the point and top of this is attached a metal guide or support, U, which extends back of the sickle to support the grain while being cut. The outer edge of the separator runs out in a curved line to force out the grain that is not to be cut and effect a perfect separation of it from the cut grain. At this end of the platform there is a board, S, to prevent the cut grain from dropping out on that side, and at the back there is a cloth screen to prevent its dropping out at the rear.

The reel W has its bearings at the outer end in the end of a horizontal beam, V, which is attached to the frame that supports the back screen, and further supported by braces, so as to avoid the use of a standard at that end, as heretofore, against which the grain strikes before it is separated, and the inner end of the reel has its bearing in a sliding box in a standard, I, attached to the outside hound and the diagonal brace h, the sliding box having a tapped stem running up above the standard, with a screw-nut, X, by means of which may, with convenience, be tightened the belt that runs from the driving-pulley x′ (on the axle of the driving-wheel) over the pulley Y on the axle of the reel.

What I claim as my invention, and desire to secure by Letters Patent as improvements on the reaping-machines secured to me by Letters Patent bearing date the 21st of June, 1834, and the 31st of January, 1845, is—

1. Placing the gearing and crank forward of the driving-wheel for protection from dirt, &c., and thus carrying the driving-wheel farther back than heretofore, and sufficiently so to balance the rear part of the frame and the raker thereon, when this position of the parts is combined with the sickle, back of the axis of motion of the driving-wheel, by means of the vibrating lever, substantially as herein described.

2. The arrangement of the seat of the raker over the end of the finger-piece, which projects beyond the range of fingers and just back of the driving-wheel, as described, in combination with and placed at the end of the reel, whereby the raker can sit with his back toward the team, and thus have free access to the cut grain laid on the platform and back of the reel, and rake it from thence onto the ground by a natural sweep of his body and lay it in a range at right angles with the swath, as described, thereby avoiding unevenness and scattering in the discharge of the wheat, as well as accomplishing the same with a great saving of labor.

C. H. McCORMICK.

Witnesses:
  A. P. BROWNE,
  J. W. THAYER.